US012669850B2

(12) United States Patent
Yen et al.

(10) Patent No.: US 12,669,850 B2
(45) Date of Patent: Jun. 30, 2026

(54) FOLDABLE ELECTRONIC DEVICE

(71) Applicant: SYNCMOLD ENTERPRISE CORP., New Taipei City (TW)

(72) Inventors: Ching-Hui Yen, New Taipei City (TW); Chien-Cheng Yeh, New Taipei City (TW); Chun-Hao Huang, New Taipei City (TW)

(73) Assignee: SYNCMOLD ENTERPRISE CORP., New Taipei City (TW)

( * ) Notice: Subject to any disclaimer, the term of this patent is extended or adjusted under 35 U.S.C. 154(b) by 62 days.

(21) Appl. No.: 18/890,878

(22) Filed: Sep. 20, 2024

(65) Prior Publication Data

US 2025/0190029 A1    Jun. 12, 2025

Related U.S. Application Data

(60) Provisional application No. 63/607,236, filed on Dec. 7, 2023.

(30) Foreign Application Priority Data

Aug. 1, 2024    (TW) ................................. 113208236

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC .... G06F 1/1613; G06F 1/1616; G06F 1/1652; G06F 1/1681; G09F 9/301
See application file for complete search history.

(56) References Cited

U.S. PATENT DOCUMENTS

| | | | | | |
|---|---|---|---|---|---|
| 11,956,379 B2 * | 4/2024 | Li | ...................... | H04M 1/0268 |
| 2021/0076520 A1 * | 3/2021 | Yen | ...................... | H05K 5/0226 |
| 2022/0407950 A1 * | 12/2022 | Huang | ................ | H04M 1/0268 |
| 2024/0414862 A1 * | 12/2024 | Kim | ...................... | H04M 1/02 |

FOREIGN PATENT DOCUMENTS

| CN | 114321596 A | 4/2022 |
|---|---|---|
| CN | 218958943 U | 5/2023 |

* cited by examiner

*Primary Examiner* — Anthony Q Edwards
(74) *Attorney, Agent, or Firm* — MUNCY, GEISSLER, OLDS & LOWE, P.C.

(57) ABSTRACT

The present invention provides a foldable electronic device comprising a central base, panel assemblies, and a scotch yoke synchronization module. The central base includes a base portion and a plate portion. Each panel assembly has a wing member pivoted to the base portion. The scotch yoke synchronization module includes a guide column, a liftable block, crank members, sliding yokes, and sliding pins. The guide column is on the plate portion, and the liftable block moves along it. Each crank member is pivoted to the base portion, with sliding yokes on the liftable block extending widthwise. Sliding pins on the crank members are accommodated in the sliding yokes for back-and-forth movement. When the liftable block moves along the guide column, the sliding pins slide in the yokes, causing the crank members to rotate in opposite directions simultaneously.

15 Claims, 12 Drawing Sheets

FOLDABLE ELECTRONIC DEVICE

CROSS REFERENCE TO RELATED APPLICATION

This application claims the benefit of U.S. Provisional Application Ser. No. 63/607,236 filed on Dec. 7, 2023, and the benefit of Taiwan Patent Application Serial No. 113208236 filed on Aug. 1, 2024. The entirety of each Application is incorporated herein by reference.

BACKGROUND OF THE INVENTION

1. Field of the Invention

The present invention relates to a foldable electronic device with a synchronously and reversely rotating module, especially a foldable electronic device with a synchronously and reversely rotating module applying a principle of a scotch yoke mechanism.

2. Description of Related Art

For foldable electronic devices, two panels rotate synchronously and reversely during folding or unfolding to ensure that they reach predetermined positions at the same time, and thus folding or unfolding can be completely achieved. Therefore, a synchronously and reversely rotating mechanism is necessarily configured. For example, as disclosed in CN218958943, a gear connection structure is provided between moving components on left and right sides of a fixing base. That is, gears at both ends of the gear connection structure are respectively fixed to shafts of the moving components on the left and right sides, so that a synchronous and reverse rotation effect occurs. For another example, as disclosed is CN114321596, first matching portions are respectively disposed on peripheries of two rotating shafts, and second matching portions are respectively provided on opposite sides of a sliding member sandwiched between the two rotating shafts. Each first matching portion correspondingly matches each second matching portion, such as by corresponding threaded parts and threaded grooves, to bring a synchronous and reverse rotation effect.

The present invention provides another synchronously and reversely rotating mechanism. By applying a principle of a scotch yoke mechanism, a synchronous and reverse rotation effect is generated.

SUMMARY OF THE INVENTION

An objective of the present invention is to provide a foldable electronic device, which is able to switch between an unfolded state and a folded state and defines a length direction, a width direction and a thickness direction substantially perpendicular with one another in the unfolded state. The foldable electronic device comprises a central base, a first panel assembly, a second panel assembly, a scotch yoke synchronization module and a flexible screen. The central base includes a base portion and a plate portion connecting with each other. The first panel assembly includes a first wing member, a first carrying member and a first panel body, wherein the first wing member is connected to the base portion and pivotal relative to the base portion about a first inner virtual axis, the first carrying member is connected to the first wing member and pivotal relative to the first wing member about a first outer rotation axis, and the first panel body is disposed on the first carrying member and rotatable along with the first carrying member. The second panel assembly includes a second wing member, a second carrying member and a second panel body, wherein the second wing member is connected to the base portion and pivotal relative to the base portion about a second inner virtual axis, the second carrying member is connected to the second wing member and pivotal relative to the second wing member about a second outer rotation axis, and the second panel body is disposed on the second carrying member and rotatable along with the second carrying member. The scotch yoke synchronization module includes a guide column, a lifting block, a first crank member, a second crank member, a first sliding yoke, a second sliding yoke, at least one first sliding pin and at least one second sliding pin. The guide column is formed on the plate portion, and the lifting block is sleeved on the guide column and substantially liftable along the thickness direction. The first crank member is connected to the first carrying member in a linearly slidable way and has a first main rod, wherein the first main rod is pivoted on the base portion about a first axis. The second crank member is connected to the second carrying member in a linearly slidable way and has a second main rod, wherein the second main rod is pivoted on the base portion about a second axis and spaced apart from the first main rod. The first sliding yoke is disposed on and liftable along with the lifting block and adjacent to the first crank member, and has a first yoke groove substantially extending along the width direction, and the second sliding yoke is disposed on and liftable along with the lifting block and adjacent to the first crank member, and has a second yoke groove substantially extending along the width direction. The at least one first sliding pin is disposed on the first crank member and accommodated in the first sliding yoke for sliding back and forth substantially along the width direction, and the at least one second sliding pin is disposed on the second crank member and accommodated in the second sliding yoke for sliding back and forth substantially along the width direction. Wherein when the lifting block moves relative to the guide column along the thickness direction, the first sliding pin and the second sliding pin simultaneously slide in the first sliding yoke and the second sliding yoke respectively, so as to make the first crank member and the second crank member rotate reversely in a simultaneous manner. The flexible screen is arranged on the first panel body, the second panel body and the central base and includes a bendable area. Wherein, in the unfolded state, the flexible screen is flattened, and the first wing member, the second wing member and the central base jointly support the bendable area, and wherein, in the folded state, the bendable area of the flexible screen bends, and the first wing member, the second wing member and the central base jointly define an accommodating space for accommodating the bendable area.

In one embodiment, the guide column, the lifting block, the first crank member, the first sliding yoke and the at least one first sliding pin collectively compose one set of scotch yoke mechanism, while the guide column, the lifting block, the second crank member, the second sliding yoke and the at least one second sliding pin collectively compose the other set of scotch yoke mechanism. Through sharing the guide column and the lifting block, when one of the first crank member and the second crank member is operated to rotate, the other of the first crank member and the second crank member is driven to rotate reversely in a simultaneous manner.

In one embodiment, the foldable electronic device is further able to switch to a half-open state between the unfolded state and the folded state. While the first sliding yoke has a first open end and a first closed end, and the second sliding yoke has a second open end and a second closed end. The first sliding pin and the second sliding pin are respectively located adjacent to the first open end and the second open end in the unfolded state. As switching from the unfolded state to the half-open state, the first sliding pin and the second sliding pin simultaneously slide in the first sliding yoke and the second sliding yoke and approach the first closed end and the second closed end correspondingly. The first sliding pin and the second sliding pin are respectively located adjacent to the first closed end and the second closed end in the half-open state. As switching from the half-open state to the folded state, the first sliding pin and the second sliding pin simultaneously slide in the first sliding yoke and the second sliding yoke and return to the first open end and the second open end correspondingly. The first sliding pin and the second sliding pin are respectively located adjacent to the first open end and the second open end again in the folded state.

In one embodiment, the first crank member further has a first inward wing protruding from the first main rod to the lifting block, and the at least one first sliding pin is formed on the first inward wing and substantially extends parallel to the length direction. And the second crank member further has a second inward wing protruding from the second main rod to the lifting block, and the at least one second sliding pin is formed on the second inward wing and substantially extends parallel to the length direction.

In one embodiment, the lifting block has a through hole for the guide column to penetrate and a cross section of the guide column matches a cross section of the through hole.

In one embodiment, the numbers of the at least one first sliding pin and the at least one second sliding pin are two, respectively.

In one embodiment, the first sliding yoke has a first central depression part and two first protruding parts, and the first central depression part is sandwiched between the two first protruding parts. The two first sliding pins are respectively formed at both ends of the first inward wing, the first inward wing is located corresponding to the first central depression part, and the first sliding pins are respectively located corresponding to the first protruding parts. While the second sliding yoke has a second central depression part and two second protruding parts, and the second central depression part is sandwiched between the two second protruding parts. The two second sliding pins are respectively formed at both ends of the second inward wing, the second inward wing is located corresponding to the second central depression part, and the second sliding pins are respectively located corresponding to the second protruding parts. When the first crank member and the second crank member rotate, interfering relative to the first sliding yoke and second sliding yoke is respectively avoided.

In one embodiment, the central base further includes at least one first inner arc-shaped slider and at least one second inner arc-shaped slider formed on the base portion at intervals. The first wing member has at least one first inner arc-shaped slideway and a first tail pivot portion, and the at least one first inner arc-shaped slider is slidably disposed in the first inner arc-shaped slideway. The first carrying member of the first panel assembly has a first pivot part, and the first pivot part is pivoted on the first tail pivot portion for jointly defining the first outer rotation axis. While the second wing member has at least one second inner arc-shaped slideway and a second tail pivot portion, and the at least one second inner arc-shaped slider is slidably disposed in the second inner arc-shaped slideway. The second carrying member of the second panel assembly has a second pivot part, and the second pivot part is pivoted on the second tail pivot portion for jointly defining the second outer rotation axis.

In one embodiment, the foldable electronic device further comprises a torque module disposed on the plate portion. The base portion has a first axis hole and a second axis hole, the first crank member further has a first bending plate and a first sliding wing plate, the second crank member has a second bending plate and a second sliding wing plate, the first carrying member further has a first straight slideway and the second carrying member further has a second straight slideway. Wherein the first main rod is pivotally inserted into the first axis hole of the base portion along the first axis and provided for the torsion module to be sleeved on, the first bending plate and the first inward wing respectively protrude from different sides of the first main rod, and the first sliding wing plate is connected to a side of the first bending plate away from the first main rod and is accommodated in the first straight slideway in a linearly slidabe manner, and wherein the second main rod is pivotally inserted into the second axis hole of the base portion along the second axis and provided for the torsion module to be sleeved on, the second bending plate and the second inward wing respectively protrude from different sides of the second main rod, and the second sliding wing plate is connected to a side of the second bending plate away from the second main rod and is accommodated in the second straight slideway in a linearly slidabe manner.

In one embodiment, the torque module includes a fixing body, a plurality of friction fixing shims, a plurality of first stop washers, a plurality of first bowl-shaped washers, a first nut, a plurality of second stop washers, a plurality of second bowl-shaped washers and a second nut. The fixing body is disposed on the plate portion and provided for the first main rod and the second main rod to be pivotally inserted therein, and each of the friction fixing shims is sleeved on the first main rod and the second main rod together. The first stop washers, the first bowl-shaped washers and the first nut are sleeved on the first main rod, and the second stop washers, the second bowl-shaped washers and the second nut are sleeved on the second main rod. Wherein the first stop washers and the friction fixing shims are staggered and located between the first bending plate and the fixing body, the second stop washers and the friction fixing shims are staggered and located between the second bending plate and the fixing body, the first nut is rotatably screwed to an end of the first main rod, the first bowl-shaped washers are sandwiched between the fixing body and the first nut, the second nut is rotatably screwed to an end of the second main rod, and the second bowl-shaped washers are sandwiched between the fixing body and the second nut.

In one embodiment, the first carrying member and the second carrying member are substantially 180 degrees apart in the unfolded state, and the first carrying member and the second carrying member are substantially 0 degree apart in the folded state. And the first carrying member and the second carrying member are able to stop at any position and sandwich an angle between 0 degree and 180 degrees through the torque module, during switching between the unfolded state and the folded state.

In one embodiment, the first panel assembly further includes a first connecting rod and a first drip plate and the second panel assembly further includes a second connecting rod and a second drip plate, the first wing member has a first central pivot portion, and the second wing member has a second central pivot portion. The first connecting rod is pivotally connected to the first central pivot portion, the first drip plate is connected to the first carrying member and the first connecting rod respectively, the second connecting rod is pivotally connected to the second central pivot portion, and the second drip plate is connected to the second carrying member and the second connecting rod respectively. In the unfolded state, the flexible screen is flattened, and the first wing member, the second wing member, the first drip plate, the second drip plate and the central base jointly support the bendable area, while in the folded state, the bendable area of the flexible screen bends, and the first wing member, the second wing member, the first drip plate, the second drip plate and the central base collectively define an accommodating space for accommodating the bendable area.

In one embodiment, the first drip plate has a first pivot convex part and a first arc-shaped edge slider, the first carrying member has a first outer arc-shaped slideway, the first arc-shaped edge slider is slidably disposed in the first outer arc-shaped slideway, the first connecting rod has a first pivot head and a first pivot tail, the first pivot convex part is pivoted to the first pivot head, and the first pivot tail is pivoted to the first central pivot portion. While the second drip plate has a second pivot convex part and a second arc-shaped edge slider, the second carrying member has a second outer arc-shaped slideway, the second arc-shaped edge slider is slidably disposed in the second outer arc-shaped slideway, the second connecting rod has a second pivot head and a second pivot tail, the second pivot convex part is pivoted to the second pivot head, and the second pivot tail is pivoted to the second central pivot portion.

In one embodiment, the first central pivot portion and the first pivot tail jointly define a first tail pivot axis, and the first connecting rod rotates relative to the first wing member about the first tail pivot axis. The first outer arc-shaped slideway defines a first outer virtual axis, the first pivot head defines a first head pivot axis, and the first drip plate rotates relative to the first carrying member and the first connecting rod respectively about the first outer virtual axis and the first head pivot axis. While the second central pivot portion and the second pivot tail jointly define a second tail pivot axis, and the second connecting rod rotates relative to the second wing member about the second tail pivot axis. The second outer arc-shaped slideway defines a second outer virtual axis, the second pivot head defines a second head pivot axis, and the second drip plate rotates relative to the second carrying member and the second connecting rod respectively about the second outer virtual axis and the second head pivot axis. And the first axis, the first inner virtual axis, the first outer rotation axis, the first tail pivot axis, the first outer virtual axis, the first head pivot axis, the second axis, the second inner virtual axis, the second outer rotation axis, the second tail pivot axis, the second outer virtual axis, the second head pivot axis are parallel to one another.

In one embodiment, in the unfolded state, the first drip plate and the second drip plate are substantially 180 degrees apart, while in the folded state, the first drip plate and the second drip plate are substantially −30 degrees apart, and the accommodating space has a water-drop-shaped cross section.

DETAILED DESCRIPTION OF THE PREFERRED EMBODIMENT

Figure 1:
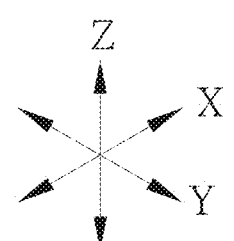
FIG. 1 is a schematic view of a foldable electronic device in an unfolded state according to the present invention.
Figure 1:
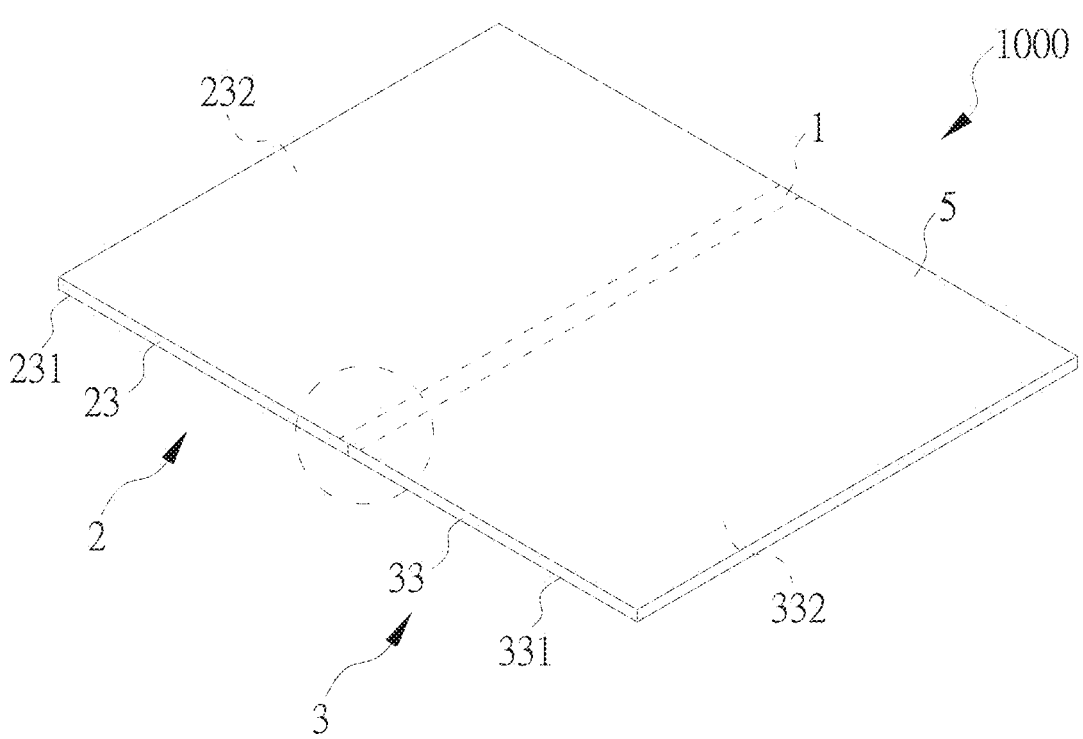
Figure 2:
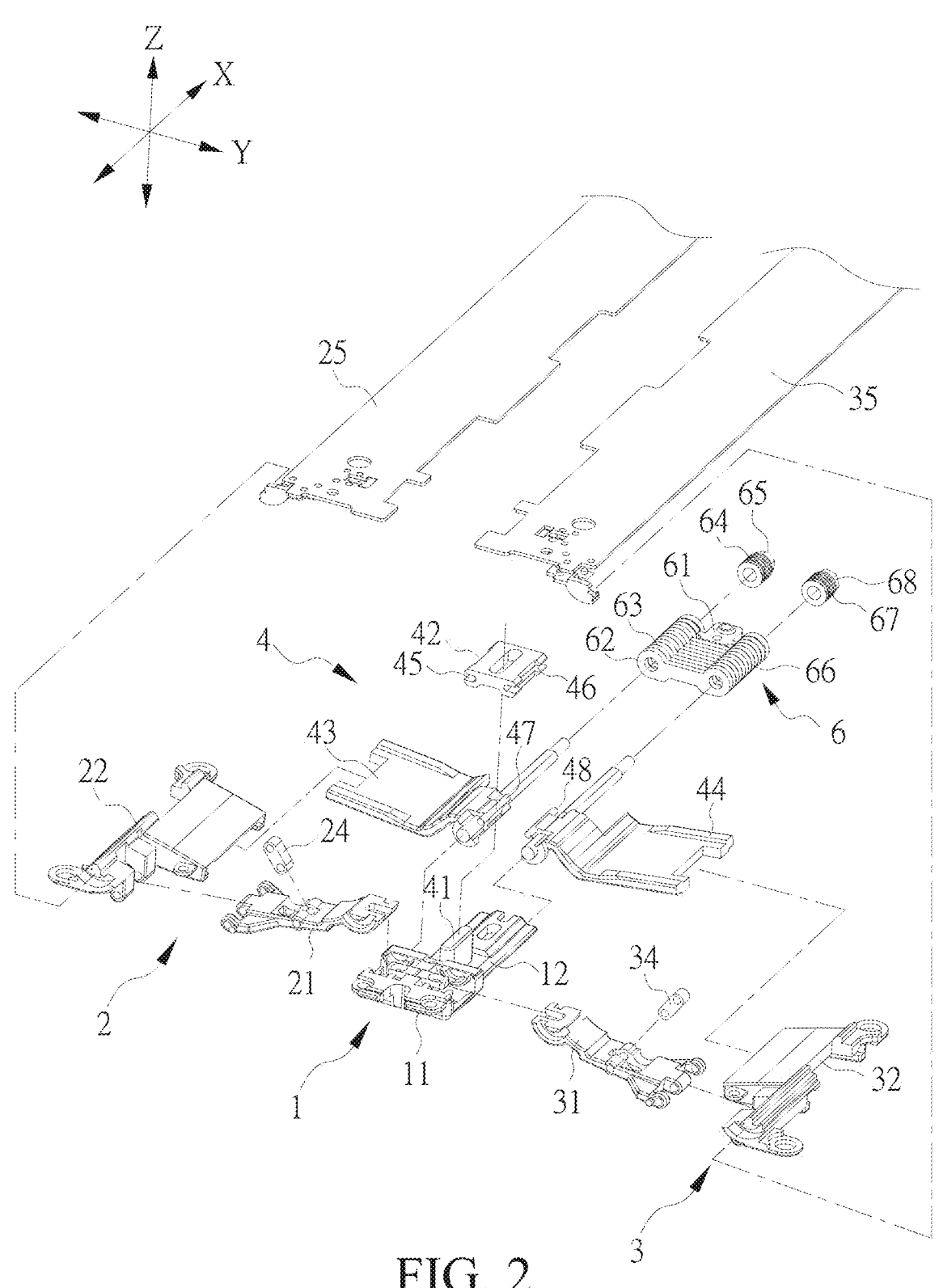
FIG. 2 is an exploded view of some components of the foldable electronic device in a circle shown in FIG. 1.
Figure 3:
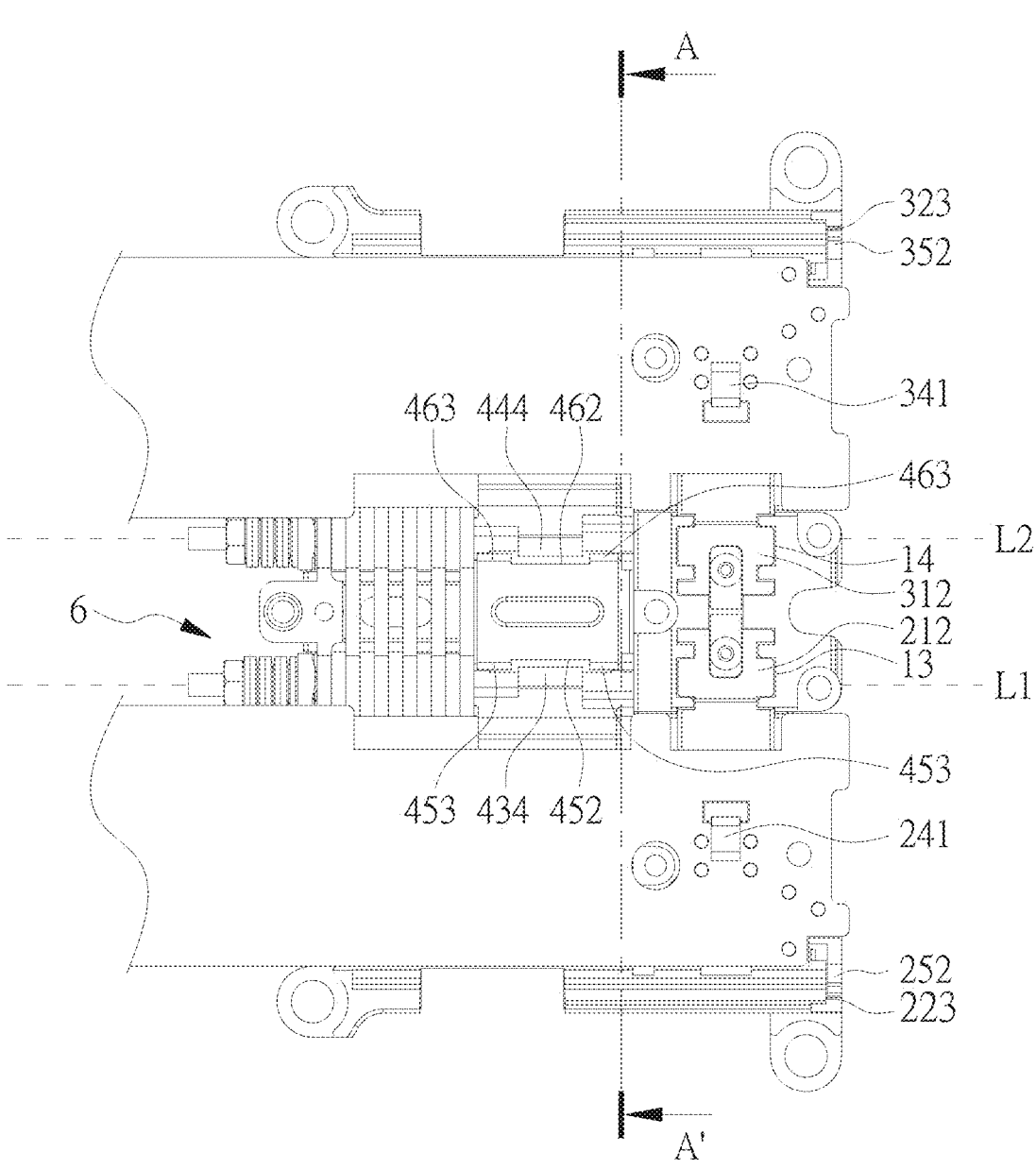
FIG. 3 is a top view of the components of the foldable electronic device in the circle shown in FIG. 1.
Figure 8:
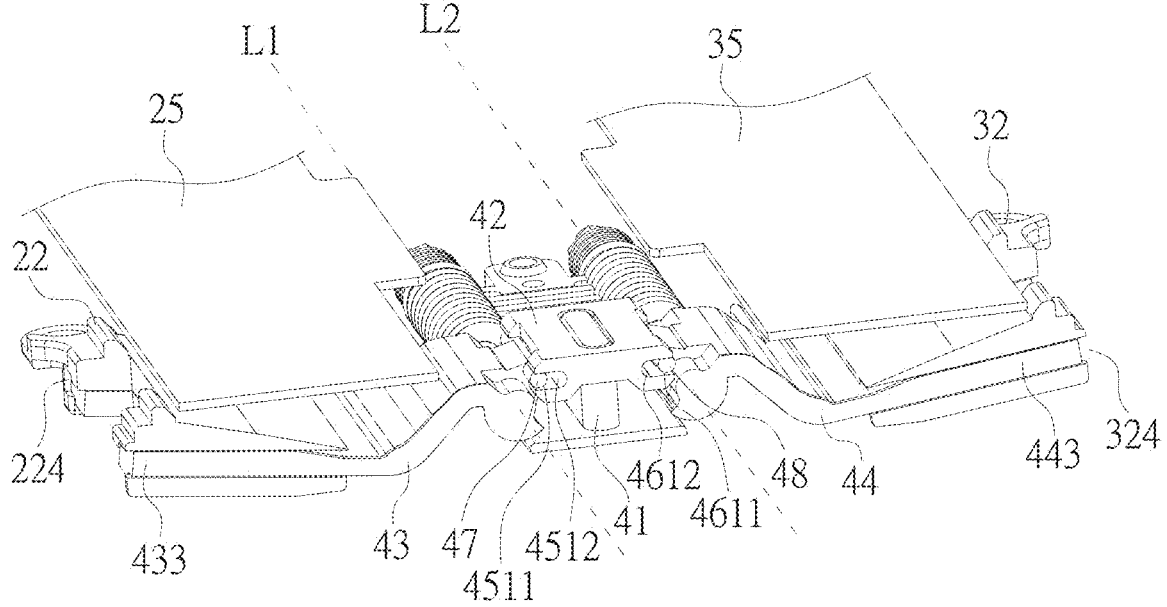
FIG. 8 is a schematic view of some components of the foldable electronic device in the unfolded state according to the present invention.
Figure 9:
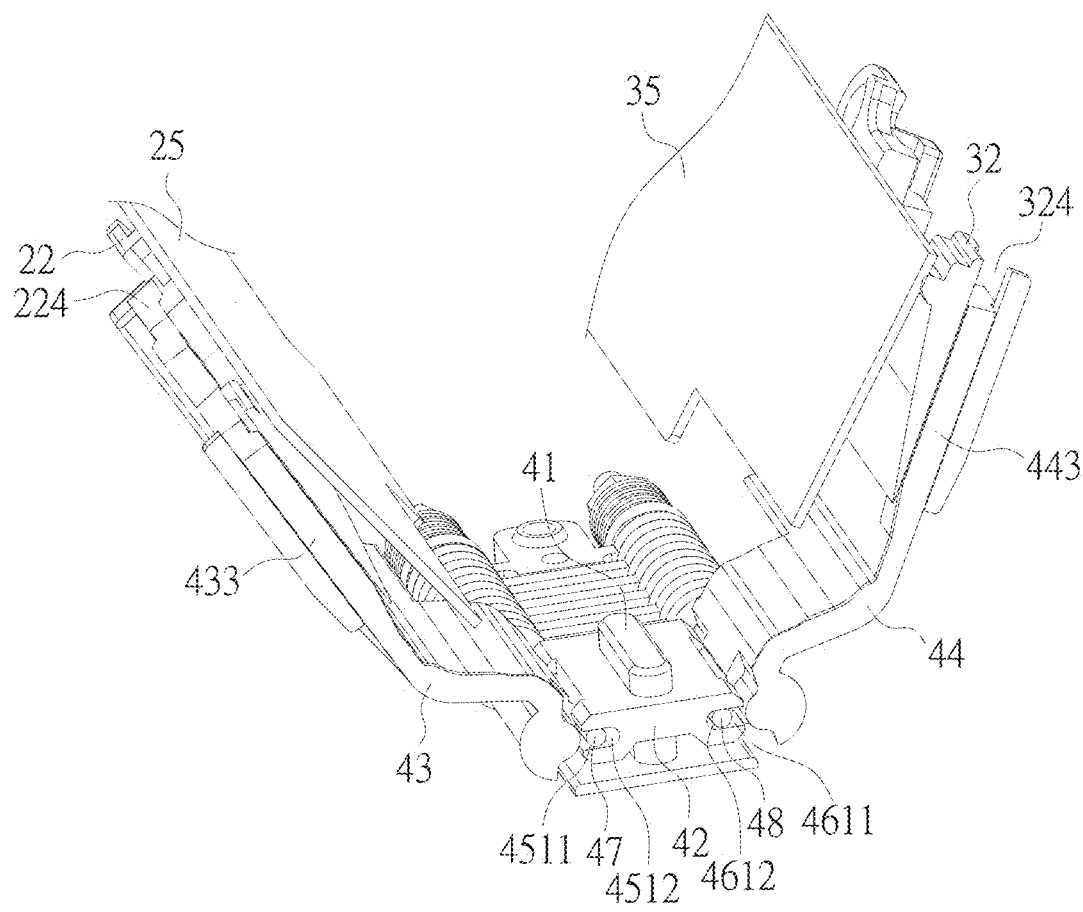
FIG. 9 is a schematic view of some components of the foldable electronic device in a half-open state according to the present invention.
Figure 10:
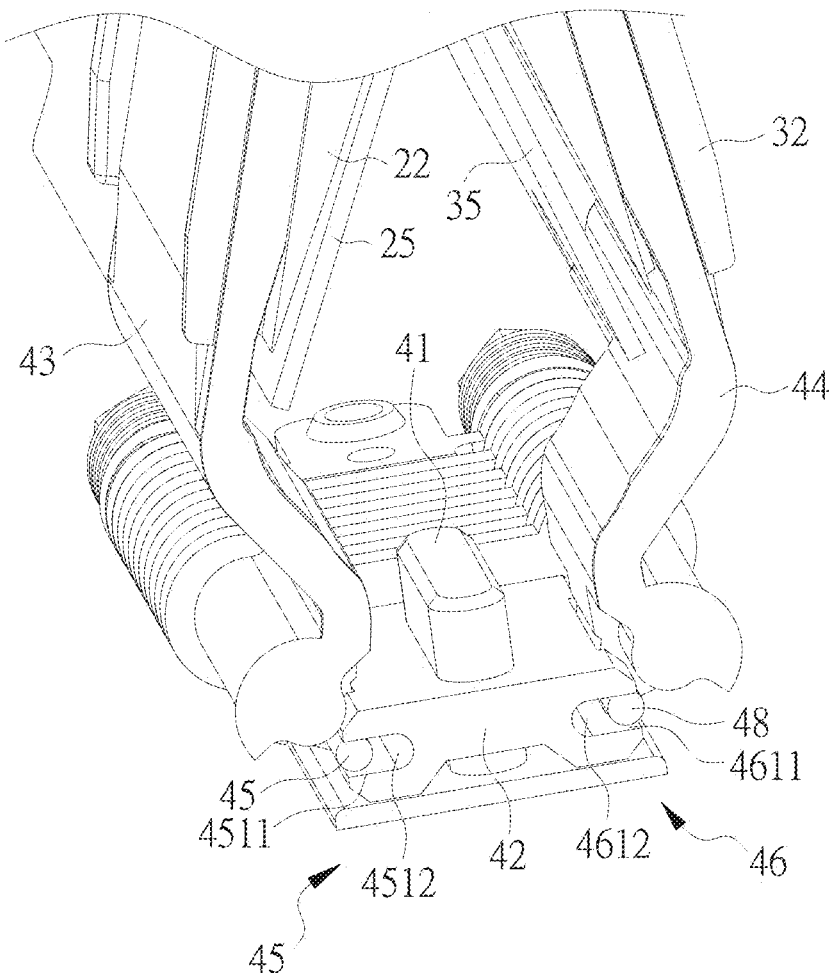
FIG. 10 is a schematic view of some components of the foldable electronic device in a folded state according to the present invention.

Please refer to FIG. 1, FIG. 2 and FIG. 3. A foldable electronic device 1000 of the present invention comprises a central base 1, a first panel assembly 2, a second panel assembly 3, a scotch yoke synchronization module 4, a flexible screen 5 and a torque module 6. The first panel assembly 2 and the second panel assembly 3 are pivotally connected to the central base 1, the scotch yoke synchronization module 4 is disposed on the central base 1 and connected to the first panel assembly 2 and the second panel assembly 3, the flexible screen 5 is disposed on the central base 1, the first panel assembly 2 and the second panel assembly 3, and the torque module 6 is disposed on the central base 1 and sleeved on the scotch yoke synchronization module 4. In addition, the foldable electronic device 1000 is able to switch between an unfolded state (as shown in FIG. 1 or FIG. 8), a half-open state (as shown in FIG. 9) and a folded state (as shown in FIG. 10), and the half-open state is between the unfolded state and the folded state. In the unfolded state, the foldable electronic device 1000 has a length direction X, a width direction Y and a thickness direction Z substantially perpendicular with one another.

Figure 4:
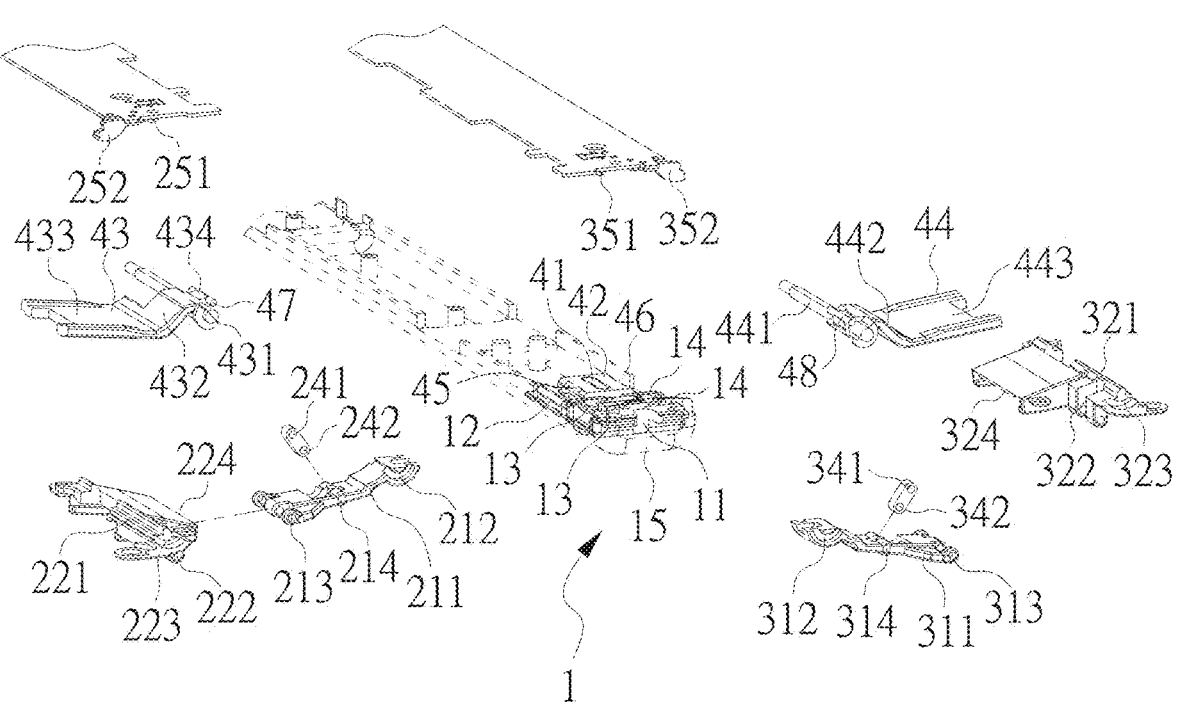
FIG. 4 is another exploded view of the components of the foldable electronic device in the circle shown in FIG. 1.
Figure 5:
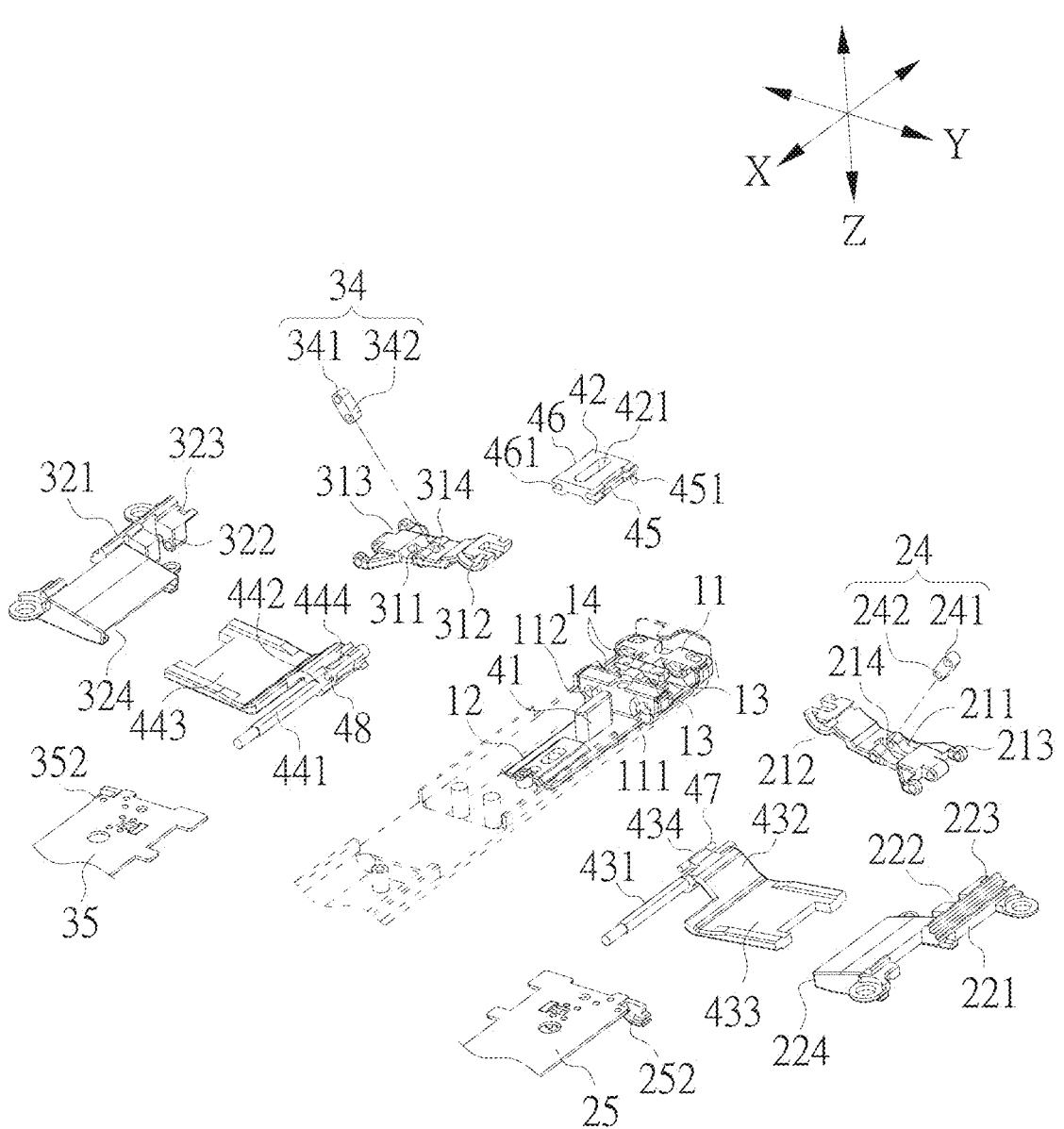
FIG. 5 is yet another exploded view of the components of the foldable electronic device in the circle shown in FIG. 1.
Figure 6:
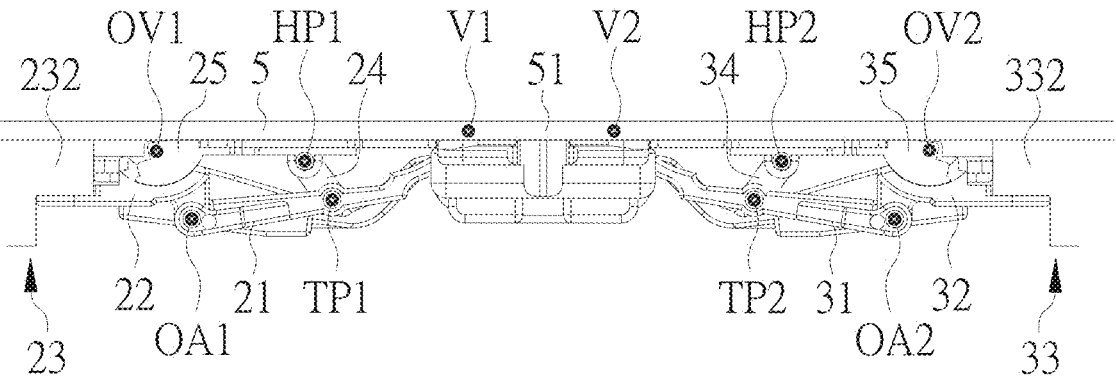
FIG. 6 is a cross-sectional view along a line A-A' shown in FIG. 3 of the foldable electronic device according to the present invention.

Please refer to FIG. 4, FIG. 5 and FIG. 6 together. The central base 1 includes a base portion 11, a plate portion 12, two first inner arc-shaped sliders 13, two second inner arc-shaped sliders 14 and a housing 15. The base portion 11 has a first axis hole 111 and a second axis hole 112, and the first axis hole 111 and the second axis hole 112 are concavely formed along a first axis L1 and a second axis L2, respectively. The plate portion 12 is roughly in a shape of a long plate connecting to the base portion 11 and extends along the length direction X. The first inner arc-shaped sliders 13 are roughly double-arc-shaped, respectively, protruding from the base portion 11 opposite to each other and spaced apart, and adjacent to one side of the base portion 11 (that is, adjacent to the first panel assembly 2), and their axis is defined as a first inner virtual axis V1. The second inner arc-shaped sliders 14 are roughly double-arc-shaped, respectively, protruding from the base portion 11 opposite to each other and spaced apart, and adjacent to the other side of the base portion 11 (that is, adjacent to the second panel assembly 3) and separated from the first inner arc-shaped sliders 13, and their axis is defined as a second inner virtual axis V2. The housing 15 covers a bottom side and two lateral sides of the base portion 11.

The first panel assembly 2 includes a first wing member 21, a first carrying member 22, a first panel body 23, a first connecting rod 24 and a first drip plate 25, which are in a connected manner.

The first wing member 21 is roughly a long arm, and has a first arm body 211, two first inner arc-shaped slideways 212, a first tail pivot portion 213 and a first central pivot portion 214. The two first inner arc-shaped slideways 212 are concavely and separately formed on opposite sides of the first arm body 211 and adjacent to the base portion 11, and respectively provided for the first inner arc-shaped sliders 13 to slide therein, whereby the first wing member 21 is capable of pivoting relative to the base portion 11 with the first inner virtual axis V1 as a center. The first tail pivot portion 213 is formed on an end of the first arm body 211 away from the first inner arc-shaped slideways 212, and the first central pivot portion 214 is approximately formed on a center of the first arm body 211.

The first carrying member 22 is roughly a block, and has a first carrying body 221, a first pivot part 222, a first outer arc-shaped slideway 223 and a first straight slideway 224. The first pivot part 222 extends from the first carrying body 221 and is pivoted on the first tail pivot portion 213. The first pivot part 222 and the first tail pivot portion 213 jointly define a first outer rotation axis OA1, whereby the first carrying member 22 is able to pivot relative to the first wing member 21 about the first outer rotation axis OA1. The first outer arc-shaped slideway 223 is formed on the first carrying body 221 and defines a first outer virtual axis OV1. The first straight slideway 224 is surroundingly defined by the first carrying body 221 and generally extends toward the central base 1.

The first panel body 23 has a first casing 231 and a first electronic module 232. The first casing 231 is roughly a rectangular plate with three edges being bent. The first electronic module 232 is mainly composed of electronic elements and details will not be described here. Meanwhile, the first casing 231 encloses the first electronic module 232.

The first connecting rod 24 is roughly a long and straight rod, and has a first pivot head 241 and a first pivot tail 242 spaced apart with each other. The first pivot head 241 is pivoted on the first drip plate 25, so that a first head pivot axis HP1 is defined. The first pivot tail 242 is pivoted on the first central pivot portion 214 and collectively define a first tail pivot axis TP1, whereby the first connecting rod 24 is capable of pivoting relative to the first wing member 21 about the first tail pivot axis TP1.

The first drip plate 25 connects the first carrying member 22 and the first connecting rod 24 correspondingly, and has a first pivot convex part 251 and a first arc-shaped edge slider 252. The first pivot convex part 251 is provided for the first pivot head 241 to pivot on, and the first arc-shaped edge slider 252 is slidably disposed in the first outer arc-shaped slideway 223, whereby the first drip plate 25 is able to pivot relative to the first carrying member 22 about the first outer virtual axis OV1 and to pivot relative to the first connecting rod 24 about the first head pivot axis HP1.

Similarly, the second panel assembly 3 includes a second wing member 31, a second carrying member 32, a second panel body 33, a second connecting rod 34 and a second drip plate 35, which are in a connected manner.

The second wing member 31 is roughly a long arm, and has a second arm body 311, two second inner arc-shaped slideways 312, a second tail pivot portion 313 and a second central pivot portion 314. The two second inner arc-shaped slideways 312 are concavely and separately formed on opposite sides of the second arm body 311 and adjacent to the base portion 11, and respectively provided for the second inner arc-shaped sliders 14 to slide therein, whereby the second wing member 31 is capable of pivoting relative to the base portion 11 with the second inner virtual axis V2 as a center. The second tail pivot portion 313 is formed on an end of the second arm body 311 away from the second inner arc-shaped slideways 312, and the second central pivot portion 314 is approximately formed on a center of the second arm body 311.

The second carrying member 32 is roughly a block, and has a second carrying body 321, a second pivot part 322, a second outer arc-shaped slideway 323 and a second straight slideway 324. The second pivot part 322 extends from the second carrying body 321 and is pivoted on the second tail pivot portion 313. The second pivot part 322 and the second tail pivot portion 313 jointly define a second outer rotation axis OA2, whereby the second carrying member 32 is able to pivot relative to the second wing member 31 about the second outer rotation axis OA2. The second outer arc-shaped slideway 323 is formed on the second carrying body 321 and defines a second outer virtual axis OV2. The second straight slideway 324 is surroundingly defined by the second carrying body 321 and generally extends toward the central base 1.

The second panel body 33 has a second casing 331 and a second electronic module 332. The second casing 331 is roughly a rectangular plate with three edges being bent. The second electronic module 332 is mainly composed of electronic elements and details will not be described here. Meanwhile, the second casing 331 encloses the second electronic module 332.

The second connecting rod 34 is roughly a long and straight rod, and has a second pivot head 341 and a second pivot tail 342 spaced apart with each other. The second pivot head 341 is pivoted on the second drip plate 35, so that a second head pivot axis HP2 is defined. The second pivot tail 342 is pivoted on the second central pivot portion 314 and collectively define a second tail pivot axis TP2, whereby the second connecting rod 34 is capable of pivoting relative to the second wing member 31 about the second tail pivot axis TP2.

The second drip plate 35 connects the second carrying member 32 and the second connecting rod 34 correspondingly, and has a second pivot convex part 351 and a second arc-shaped edge slider 352. The second pivot convex part 351 is provided for the second pivot head 341 to pivot on, and the second arc-shaped edge slider 352 is slidably disposed in the second outer arc-shaped slideway 323, whereby the second drip plate 35 is able to pivot relative to the second carrying member 32 about the second outer virtual axis OV2 and to pivot relative to the second connecting rod 34 about the second head pivot axis HP2.

Figure 7:
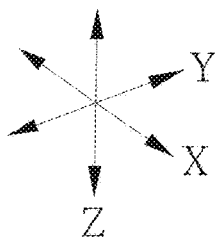
FIG. 7 is an exploded view of a lifting block, a first crank member and a second crank member of the foldable electronic device according to the present invention.
Figure 7:
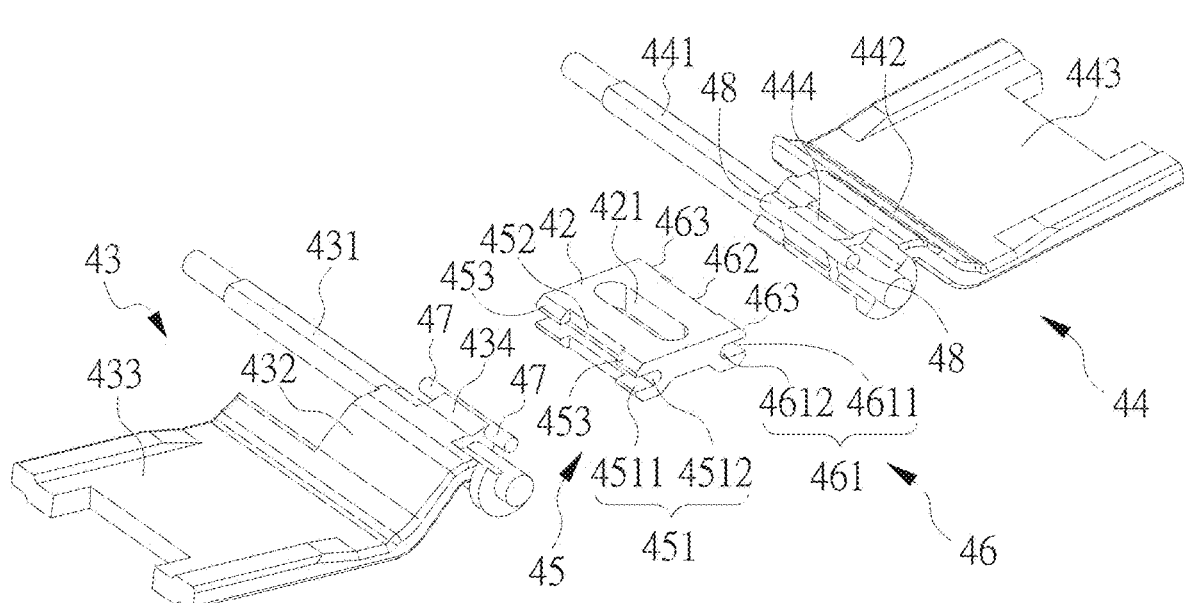

Cooperatively referring to FIG. 7, the scotch yoke synchronization module 4 includes a guide column 41, a lifting block 42, a first crank member 43, a second crank member 44, a first sliding yoke 45, a second sliding yoke 46, two first sliding pins 47 and two second sliding pins 48.

The guide column 41 is formed on the plate portion 12 and substantially extends along the thickness direction Z.

The lifting block 42 has a through hole 421 for the guide column 41 to penetrate. Meanwhile, a cross section of the guide column 41 matches a cross section of the through hole 421, so that the lifting block 42 is liftably sleeved on the guide column 41 along the thickness direction Z.

The first crank member 43 is connected to the first carrying member 22 in a linearly slidable way, and has a first main rod 431, a first bending plate 432, a first sliding wing plate 433 and a first inward wing 434, which are integrally formed. One end of the first main rod 431 is inserted into the first axis hole 111 of the base portion 11 along the first axis L1, with the other end for the torque module 6 to sleeve thereon. The first bending plate 432 and the first inward wing 434 respectively protrude from different sides of the first main rod 431. The first sliding wing plate 433 is connected to a side, away from the first main rod 431, of the first bending plate 432 and is accommodated and linearly slidable in the first straight slideway 224. The second crank member 44 is approximately configured relative to the first crank member 43 in a mirror symmetry manner, with the guide column 41 as a reference. The second crank member 44 is connected to the second carrying member 32 in a linearly slidable way, and has a second main rod 441, a second bending plate 442, a second sliding wing plate 443 and a second inward wing 444, which are integrally formed. One end of the second main rod 441 is inserted into the second axis hole 112 of the base portion 11 along the second axis L2, with the other end for the torque module 6 to sleeve thereon. The second bending plate 442 and the second inward wing 444 respectively protrude from different sides of the second main rod 441. The second sliding wing plate 443 is connected to a side, away from the second main rod 441, of the second bending plate 442 and is accommodated and linearly slidable in the second straight slideway 324.

The first sliding yoke 45 is disposed on one side, adjacent to the first crank member 43, of the lifting block 42, and has a first yoke groove 451, a first central depression part 452 and two first protruding parts 453. The first yoke groove 451 extends along the width direction Y and has a first open end 4511 and a first closed end 4512. Along the length direction X, the first central depression part 452 is sandwiched between the two first protruding parts 453. Namely, the first sliding yoke 45 is roughly U-shaped in the length direction X and in the thickness direction Z respectively. The second sliding yoke 46 is disposed on the other side, adjacent to the first second crank member 44, of the lifting block 42, and approximately configured relative to the first sliding yoke 45 in a mirror symmetry manner, with the lifting block 42 as a reference. The second sliding yoke 46 has a second yoke groove 461, a second central depression part 462 and two second protruding parts 463. The second yoke groove 461 extends along the width direction Y and has a second open end 4611 and a second closed end 4612. Along the length direction X, the second central depression part 462 is sandwiched between the two second protruding parts 463. Namely, the second sliding yoke 46 is roughly U-shaped in the length direction X and in the thickness direction Z respectively.

The two first sliding pins 47 are respectively formed on two ends of the first inward wing 434 and extend in parallel with the length direction X, so as to be slidably accommodated in the first sliding yoke 45. The two second sliding pins 48 are respectively formed on two ends of the second inward wing 444 and extend in parallel with the length direction X, so as to be slidably accommodated in the second sliding yoke 46.

In this embodiment, the first sliding yoke 45 and the second sliding yoke 46 are integrally formed with the lifting block 42, so as to be together lifted with the lifting block 42. The first sliding pins 47 and the second sliding pins 48 are cylinders respectively, but not limited thereto.

The flexible screen 5 is approximately disposed corresponding to the central base 1, the first panel assembly 2 and the second panel assembly 3, and includes a bendable area 51. Furthermore, in the unfolded state, the flexible screen 5 is supported collectively by the base portion 11, the first panel body 23, the second panel body 33, the first drip plate 25 and the second drip plate 35. And the bendable area 51 is approximately positioned on the central base 1 and extends on both sides to cover parts of the first drip plate 25 and the second drip plate 35.

The torque module 6 includes a fixing body 61, a plurality of friction fixing shims 62, a plurality of first stop washers 63, a plurality of first bowl-shaped washers 64, a first nut 65, a plurality of second stop washers 66, a plurality of second bowl-shaped washers 67 and a second nut 68. The fixing body 61 is disposed on the plate portion 12 for the first main rod 431 and the second main rod 441 to pivotally penetrate along the first axis L1 and the second axis L2, respectively. Each of the friction fixing shims 62 respectively sleeves both on the first main rod 431 and the second main rod 441. The first stop washers 63, the first bowl-shaped washers 64 and the first nut 65 are sleeved on the first main rod 431, and the second stop washers 66, the second bowl-shaped washers 67 and the second nut 68 are sleeved on the second main rod 441. Wherein, the first stop washers 63 and the friction fixing shims 62 are arranged in a staggered manner, and are located between the first bending plate 432 and the fixed body 61. Also, the second stop washers 66 and the friction fixing shims 62 are arranged in a staggered manner, and are located between the second bending plate 442 and the fixed body 61. The first nut 65 is screwably locked to an end (externally threaded) of the first main rod 431 and the first bowl-shaped washers 64 are sandwiched between the fixed body 61 and the first nut 65, while the second nut 68 is screwably locked to an end (externally threaded) of the second main rod 441 and the second bowl-shaped washers 67 are sandwiched between the fixed body 61 and the second nut 68.

With the above configuration, the first stop washers 63 and the first bowl-shaped washers 64 constantly provide a first elastic force, so that the first panel assembly 2 is able to stop at any arbitrary angle during pivoting relative to the central base 1. The first elastic force is adjustable by altering a distance between the first nut 65 and the first bending plate 432. Meanwhile, the second stop washers 63 and the second bowl-shaped washers 64 constantly provide a second elastic force, so that the second panel assembly 3 is able to stop at any arbitrary angle during pivoting relative to the central base 1. The second elastic force is adjustable by altering a distance between the second nut 68 and the second bending plate 442. Wherein, the arbitrary angle is between 0 degree and 90 degrees. That is, the first panel assembly 2 (or the first carrying member 22) and the second panel assembly 3 (or the second carrying member 32) are able to stop at any position and sandwich an angle between 0 degree and 180 degrees.

As a side note, FIG. 6 is a cross-sectional view along a line A-A' shown in FIG. 3 of the foldable electronic device according to the present invention. Wherein, the first outer rotation axis OA1, the second outer rotation axis OA2, the first tail pivot axis TP1, the second tail pivot axis TP2, the first inner virtual axis V1, the second inner virtual axis V2, the first outer virtual axis OV1, the first head pivot axis HP1, the second outer virtual axis OV2, the second head pivot axis HP2, the first axis L1 and the second axis L2 are substantially parallel to each other.

Referring to FIG. 8, FIG. 9 and FIG. 10, the actuation of the foldable electronic device 1000 of the present invention is described below. In the unfolded state (FIG. 8), the flexible screen 5 is flattened, and the base portion 11, the first panel body 23, the second panel body 33, the first drip plate 25 and the second drip plate 35 jointly support the flexible screen 5. Respectively, the first drip plate 25 relative to the second drip plate 35, the first panel body 23 relative to the second panel body 33, and the first carrying body 221 relative to the second carrying body 321 are approximately 180 degrees apart. The first sliding wing plate 433 of the first crank member 43 is approximately 160 degrees apart from the second sliding wing plate 443 of the second crank member 44, and the first wing member 21 is approximately 210 degrees apart from the second wing member 31. On the other hand, the lifting block 42 is farthest from the plate portion 12, the first sliding pins 47 are respectively located at the first open ends 4511 of the first yoke groove 451, and the second sliding pins 48 are respectively located at the second open ends 4611 of the second yoke groove 461.

As switching from the unfolded state to the half-open state (FIG. 9), the first wing member 21 and the second wing member 31 respectively pivot about the first inner virtual axis V1 and the second inner virtual axis V2, so that the first tail pivot portion 213 and the second tail pivot portion 313 roughly approach with each other and the first carrying member 22 and the second carrying member 32 respectively pivot about the first outer rotation axis OA1 and second outer rotation axis OA2. Meanwhile, the first carrying member 22 and the second carrying member 32 respectively pivot, correspondingly relative to the first drip plate 25 and the second drip plate 35, about the first outer virtual axis OV1 and second outer virtual axis OV2, and the first connecting rod 24 and the second connecting rod 34 respectively pivot, correspondingly relative to the first wing member 21 and the second wing member 31, about the first tail pivot axis TP1 and the second tail pivot axis TP2. At the same time, the first connecting rod 24 and the second connecting rod 34 respectively pivot, correspondingly relative to the first drip plate 25 and the second drip plate 35, about the first head pivot axis HP1 and the second head pivot axis HP2. That is, the state, which an upper surface of the first drip plate 25, an upper surface of the second drip plate 35 and an upper surface of the base portion 11 are coplanar, gradually becomes another state that the first drip plate 25 and the second drip plate 35 is respectively oblique relative to the base portion 11. Correspondingly, the first sliding wing plate 433 and the second sliding wing plate 443 linearly slide in the first straight slideway 224 and the second straight slideway 324 (from one end to the other end of those slideways) respectively. The first main rod 431 and the second main rod 441 reversely rotate about the first axis L1 and the second axis L2, respectively, and the lifting block 42 approaches the plate portion 12 along the guide column 41 (namely, parallel to the thickness direction Z). As the lifting block 42 moves, the first sliding pins 47 in the first sliding yoke 45 and the second sliding pins 48 in the second sliding yoke 46 are driven at the same time, so that the first main rod 431 and the second main rod 441 are able to reversely rotate in a synchronous manner. At this time, the first sliding pins 47 move from the first open ends 4511 to the first closed ends 4512 of the first yoke groove 451 (namely, move inwardly), and the second sliding pins 48 move from the second open ends 4611 to the second closed ends 4612 of the second yoke groove 461 (namely, move inwardly).

In the half-open state (FIG. 9), the first panel body 23 relative to the second panel body 33, the first carrying body 221 relative to the second carrying body 321 and the first sliding wing plate 433 of the first crank member 43 relative to the second sliding wing plate 443 of the second crank member 44 are approximately 90 degrees apart. An included angle between the first drip plate 25 and the second drip plate 35 becomes smaller, and an included angle between the first wing member 21 and the second wing member 31 also becomes smaller. Moreover, a center of the lifting block 42 is located at a half height of the guide column 41, the first sliding pins 47 are respectively adjacent to the first closed ends 4512 of the first yoke groove 451, and the second sliding pins 48 are respectively adjacent to the second closed ends 4612 of the second yoke groove 461.

As switching from the half-open state to the folded state (FIG. 10), the first tail pivot portion 213 and the second tail pivot portion 313 approach closer and closer with each other, the first panel body 23 relative to the second panel body 33, the first carrying body 221 relative to the second carrying body 321 and first wing member 21 relative to the second wing member 31 are approximately parallel (approximately 0 degree apart), gradually. Moreover, the included angle between the first drip plate 25 and the second drip plate 35 and the included angle between the first wing member 21 and the second wing member 31 become much smaller, and even become relatively negative. At this time, the lifting block 42 gets even closer to the plate portion 12 along the guide column 41 and parallel to the thickness direction Z, the first sliding pins 47 respectively return to the first open ends 4511 of the first yoke groove 451 (namely, move outwardly), and the second sliding pins 48 respectively return to the second open ends 4611 of the second yoke groove 461 (namely, move outwardly).

Figure 11:
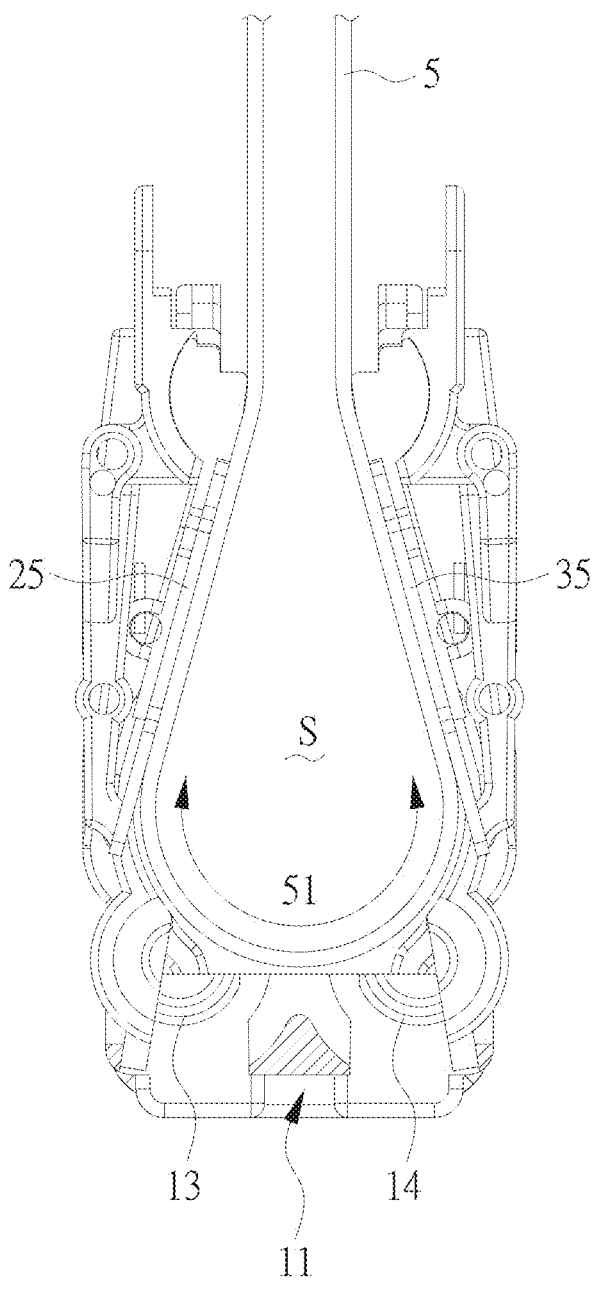
FIG. 11 is a cross-sectional view of the foldable electronic device shown in FIG. 6 after being switched to the folded state.

In the folded state (FIG. 10), the first drip plate 25 and the second drip plate 35 are approximately −30 degrees apart (that is, an interval adjacent to the base portion 11 is bigger and an interval far from the base portion 11 is smaller, as shown in FIG. 11), and the first sliding wing plate 433 and the second sliding wing plate 443 are also approximately −30 degrees apart. The first panel body 23 relative to the second panel body 33, the first carrying body 221 relative to the second carrying body 321, and first wing member 21 relative to the second wing member 31 are approximately 0 degree apart (parallel to each other respectively). At this time, the lifting block 42 is closest to and even abuts the guide column 41, the first sliding pins 47 are respectively located at the first open ends 4511 of the first yoke groove 451 again, and the second sliding pins 48 are respectively located at the first open ends 4611 of the second yoke groove 461 again.

Further, there are two sets of scotch yoke mechanisms in the scotch yoke synchronization module 4. The first set is composed of the guide column 41, the lifting block 42, the first crank member 43, the first sliding yoke 45 and the two first sliding pins 47, while the second set is composed of the guide column 41, the lifting block 42, the second crank member 44, the second sliding yoke 46 and the two second sliding pins 48. Among them, the guide column 41, the lifting block 42 are shared, the first sliding pins 47 are integrally formed with the first main rod 431 of the first crank member 43, and the second sliding pins 48 are integrally formed with the second main rod 441 of the second crank member 44, so the two sets of scotch yoke mechanisms are synchronous in converting the linear motion into the rotational motion, or vice versa, synchronous in converting the rotational motion into the linear motion. Therefore, during switching from the unfolded state to the folded state, even when only the first panel assembly 2 is operated to pivot relative to the central base 1, the first main rod 431 pivots (rotates) about the first axis L1 and brings the first sliding pins 47 to linearly move in the first sliding yoke 45 and to drive the lifting block 42 approaching the plate portion 12, which synchronously makes the second sliding pins 48 to linearly move in the second sliding yoke 46, and let the second main rod 441 reversely pivot (rotate) about the second axis L2, so that the second panel assembly 3 synchronously pivots relative to the central base 1. Similarly, if only the second panel assembly 3 is moved to pivot, the first panel assembly 2 will synchronously and reversely pivot. On the other hand, it is also synchronously during switching from the folded state to the unfolded state, and no more details will be given here.

In this embodiment, the first sliding yoke 45 is coordinated with the two first sliding pins 47 as a set, and the second sliding yoke 46 is coordinated with the two second sliding pins 48 as a set. But it still works for the first sliding yoke 45 to be coordinated with only one first sliding pin 47, or for the second sliding yoke 46 to be coordinated with only one second sliding pin 48. Also, each number of the above sets can be plural. In addition, the first sliding yoke 45 and second sliding yoke 46 can be modified from an open type (with one open end and a closed end) to a closed or slotted type (with two closed ends). On the other hand, the height of the guide column 41, which is greater than a thickness of the lifting block 42 in the thickness direction Z, may also be appropriately reduced (for example, approximately the same thickness as that of the lifting block 42) to avoid interference with the flexible screen 5.

From a mechanical point of view, two sets of six-bar linkages are applied for this embodiment. The first set is composed of the base portion 11, the first wing member 21, the first carrying member 22, the first connecting rod 24, the first drip plate 25 and the first crank member 43, and the second set is composed of the base portion 11, the second wing member 31, the second carrying member 32, the second connecting rod 34, the second drip plate 35 and the second crank member 44. With the above configuration, in the folded state, since the first sliding wing plate 433 and the second sliding wing plate 443 are approximately −30 degree apart, the bendable area 51 of the flexible screen 5 bends, and the first wing member 21, the second wing member 31, the first drip plate 25, the second drip plate 35 and the base portion 11 of the central base 1 jointly define an accommodating space S for accommodating the bendable area 51. The accommodating space S has a water-drop-shaped cross section (as shown in FIG. 11).

As a side note, the first sliding pins 47 are respectively formed at both ends of the first inward wing 434, and that is, the overall shape is roughly T-shaped, while the first inward wing 434 is located corresponding to the first central depression part 452 and the two first sliding pins 47 are respectively located corresponding to the two first protruding parts 453. Therefore, during pivoting, the first inward wing 434 will not collide or interfere with the first sliding yoke 45, and the first sliding pins 47 are able to slide smoothly in the first yoke groove 451. On the other hand, the second sliding pins 48 are respectively formed at both ends of the second inward wing 444, and that is, the overall shape is roughly T-shaped, while the second inward wing 444 is located corresponding to the second central depression part 462 and the two second sliding pins 48 are respectively located corresponding to the two second protruding parts 463. Therefore, during pivoting, the second inward wing 444 will not collide or interfere with the second sliding yoke 46, and the second sliding pins 48 are able to slide smoothly in the second yoke groove 461.

Figure 12:
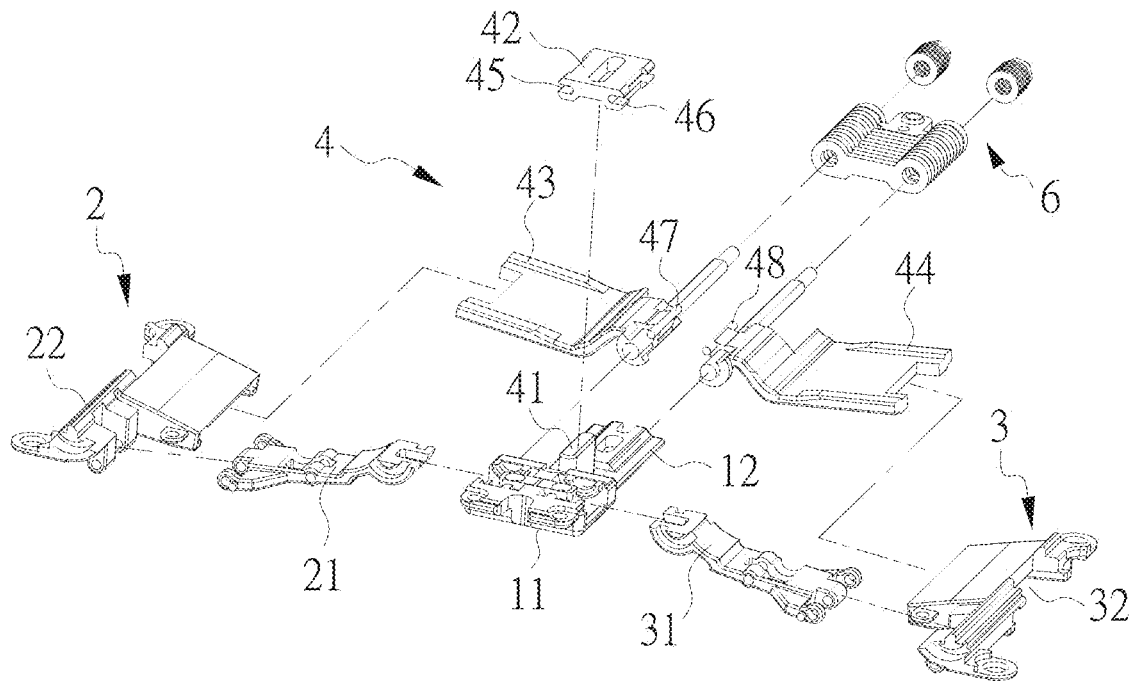
FIG. 12 is an exploded view of some components of another embodiment of the foldable electronic device according to the present invention.

Please refer to FIG. 12. It is another embodiment of the present invention, with a main difference of that two sets of four-bar linkages are applied here, relative to the previous embodiment. Since the four-bar linkage is short of two bars compared with the six-bar linkage, the first connecting rod 24, the first drip plate 25, the second connecting rod 34 and the second drip plate 35 in the previous embodiment are omitted in this embodiment, and the remaining components are the same. That is to say, the two sets of scotch yoke mechanisms in the scotch yoke synchronization module 4 are still retained, so a synchronization effect also occurs. Since the first drip plate 25 and the second drip plate 35 are omitted in this embodiment, the accommodating space S is not defined with the water-drop-shaped cross section in the folded state, but with a U-shaped cross section. However, it is possible to make up for omitted supporting force of the first drip plate 25 and the second drip plate 35 by adding other supporting plates (for example, disposed against the base portion 11), which will not be described again here.

To sum up, in the foldable electronic device of the present invention, through the two sets of scotch yoke mechanisms in the scotch yoke synchronization module, it is synchronous in converting the linear motion into the rotational motion, and synchronous in converting the rotational motion into the linear motion. As a result, the first panel assembly and the second panel assembly are ensured to reach predetermined positions at the same time, and thus folding or unfolding can be synchronously and completely achieved.

What is claimed is:

1. A foldable electronic device, being able to switch between an unfolded state and a folded state, defining a length direction, a width direction and a thickness direction substantially perpendicular with one another in the unfolded state, comprising:

a central base including a base portion and a plate portion connecting with each other;

a first panel assembly including a first wing member connecting the base portion and pivotal relative to the base portion about a first inner virtual axis, a first carrying member connecting the first wing member and pivotal relative to the first wing member about a first outer rotation axis, and a first panel body disposed on the first carrying member and rotatable along with the first carrying member, a second panel assembly including a second wing member connecting the base portion and pivotal relative to the base portion about a second inner virtual axis, a second carrying member connecting the second wing member and pivotal relative to the second wing member about a second outer rotation axis, and a second panel body disposed on the second carrying member and rotatable along with the second carrying member, a scotch yoke synchronization module including a guide column formed on the plate portion, a lifting block sleeved on the guide column and substantially liftable along the thickness direction, a first crank member connecting the first carrying member in a linearly slidable way and having a first main rod, wherein the first main rod is pivoted on the base portion about a first axis, a second crank member connecting the second carrying member in a linearly slidable way and having a second main rod, wherein the second main rod is pivoted on the base portion about a second axis and spaced apart from the first main rod, a first sliding yoke disposed on and liftable along with the lifting block, adjacent to the first crank member, and having a first yoke groove substantially extending along the width direction, a second sliding yoke disposed on and liftable along with the lifting block, adjacent to the second crank member, and having a second yoke groove substantially extending along the width direction, at least one first sliding pin disposed on the first crank member and accommodated in the first sliding yoke for sliding back and forth substantially along the width direction, and at least one second sliding pin disposed on the second crank member and accommodated in the second sliding yoke for sliding back and forth substantially along the width direction, wherein when the lifting block moves relative to the guide column along the thickness direction, the first sliding pin and the second sliding pin simultaneously slide in the first sliding yoke and the second sliding yoke respectively, so as to make the first crank member and the second crank member rotate reversely in a simultaneous manner; and a flexible screen arranged on the first panel body, the second panel body and the central base, and including a bendable area;

wherein as in the unfolded state, the flexible screen is flattened, and the first wing member, the second wing member and the central base jointly support the bendable area, and wherein as in the folded state, the bendable area of the flexible screen bends, and the first wing member, the second wing member and the central base jointly define an accommodating space for accommodating the bendable area.

2. The foldable electronic device as claimed in claim 1, wherein the guide column, the lifting block, the first crank member, the first sliding yoke and the at least one first sliding pin collectively compose one set of scotch yoke mechanism, wherein the guide column, the lifting block, the second crank member, the second sliding yoke and the at least one second sliding pin collectively compose the other set of scotch yoke mechanism, and wherein, through sharing the guide column and the lifting block, when one of the first crank member and the second crank member is operated to rotate, the other of the first crank member and the second crank member is driven to rotate reversely in a simultaneous manner.

3. The foldable electronic device as claimed in claim 2, wherein the foldable electronic device is further able to switch to a half-open state between the unfolded state and the folded state, wherein the first sliding yoke has a first open end and a first closed end, and the second sliding yoke has a second open end and a second closed end, wherein the first sliding pin and the second sliding pin are respectively located adjacent to the first open end and the second open end in the unfolded state, wherein, as switching from the unfolded state to the half-open state, the first sliding pin and the second sliding pin simultaneously slide in the first sliding yoke and the second sliding yoke and approach the first closed end and the second closed end correspondingly, wherein the first sliding pin and the second sliding pin are respectively located adjacent to the first closed end and the second closed end in the half-open state, wherein, as switching from the half-open state to the folded state, the first sliding pin and the second sliding pin simultaneously slide in the first sliding yoke and the second sliding yoke and return to the first open end and the second open end correspondingly, and wherein the first sliding pin and the second sliding pin are respectively located adjacent to the first open end and the second open end again in the folded state.

4. The foldable electronic device as claimed in claim 3, wherein the first crank member further has a first inward wing protruding from the first main rod to the lifting block, and the at least one first sliding pin is formed on the first inward wing and substantially extends parallel to the length direction, and wherein the second crank member further has a second inward wing protruding from the second main rod to the lifting block, and the at least one second sliding pin is formed on the second inward wing and substantially extends parallel to the length direction.

5. The foldable electronic device as claimed in claim 4, wherein the lifting block has a through hole for the guide column to penetrate and a cross section of the guide column matches a cross section of the through hole.

6. The foldable electronic device as claimed in claim 5, wherein the numbers of the at least one first sliding pin and the at least one second sliding pin are two, respectively.

7. The foldable electronic device as claimed in claim 6, wherein the first sliding yoke has a first central depression part and two first protruding parts, and the first central depression part is sandwiched between the two first protruding parts, wherein the two first sliding pins are respectively formed at both ends of the first inward wing, the first inward wing is located corresponding to the first central depression part, and the first sliding pins are respectively located corresponding to the first protruding parts, wherein the second sliding yoke has a second central depression part and two second protruding parts, and the second central depression part is sandwiched between the two second protruding parts, wherein the two second sliding pins are respectively formed at both ends of the second inward wing, the second inward wing is located corresponding to the second central depression part, and the second sliding pins are respectively located corresponding to the second protruding parts, and wherein when the first crank member and the second crank member rotate, interfering relative to the first sliding yoke and second sliding yoke is respectively avoided.

8. The foldable electronic device as claimed in claim 7, wherein the central base further includes at least one first inner arc-shaped slider and at least one second inner arc-shaped slider formed on the base portion at intervals, the first wing member has at least one first inner arc-shaped slideway and a first tail pivot portion, the at least one first inner arc-shaped slider is slidably disposed in the first inner arc-shaped slideway, the first carrying member of the first panel assembly has a first pivot part, and the first pivot part is pivoted on the first tail pivot portion for jointly defining the first outer rotation axis, and wherein the second wing member has at least one second inner arc-shaped slideway and a second tail pivot portion, the at least one second inner arc-shaped slider is slidably disposed in the second inner arc-shaped slideway, the second carrying member of the second panel assembly has a second pivot part, and the second pivot part is pivoted on the second tail pivot portion for jointly defining the second outer rotation axis.

9. The foldable electronic device as claimed in claim 8, further comprising a torque module disposed on the plate portion, wherein the base portion has a first axis hole and a second axis hole, the first crank member further has a first bending plate and a first sliding wing plate, the second crank member has a second bending plate and a second sliding wing plate, the first carrying member further has a first straight slideway and the second carrying member further has a second straight slideway, wherein the first main rod is pivotally inserted into the first axis hole of the base portion along the first axis and provided for the torsion module to be sleeved on, the first bending plate and the first inward wing respectively protrude from different sides of the first main rod, and the first sliding wing plate is connected to a side of the first bending plate away from the first main rod and is accommodated in the first straight slideway in a linearly slidabe manner, and wherein the second main rod is pivotally inserted into the second axis hole of the base portion along the second axis and provided for the torsion module to be sleeved on, the second bending plate and the second inward wing respectively protrude from different sides of the second main rod, and the second sliding wing plate is connected to a side of the second bending plate away from the second main rod and is accommodated in the second straight slideway in a linearly slidabe manner.

10. The foldable electronic device as claimed in claim 9, wherein the torque module includes a fixing body, a plurality of friction fixing shims, a plurality of first stop washers, a plurality of first bowl-shaped washers, a first nut, a plurality of second stop washers, a plurality of second bowl-shaped washers and a second nut, wherein the fixing body is disposed on the plate portion and provided for the first main rod and the second main rod to be pivotally inserted therein, each of the friction fixing shims is sleeved on the first main rod and the second main rod together, the first stop washers, the first bowl-shaped washers and the first nut are sleeved on the first main rod, and the second stop washers, the second bowl-shaped washers and the second nut are sleeved on the second main rod, and wherein the first stop washers and the friction fixing shims are staggered and located between the first bending plate and the fixing body, the second stop washers and the friction fixing shims are staggered and located between the second bending plate and the fixing body, the first nut is rotatably screwed to an end of the first main rod, the first bowl-shaped washers are sandwiched between the fixing body and the first nut, the second nut is rotatably screwed to an end of the second main rod, and the second bowl-shaped washers are sandwiched between the fixing body and the second nut.

11. The foldable electronic device as claimed in claim 10, wherein the first carrying member and the second carrying member are substantially 180 degrees apart in the unfolded state, the first carrying member and the second carrying member are substantially 0 degree apart in the folded state, and wherein the first carrying member and the second carrying member are able to stop at any position and sandwich an angle between 0 degree and 180 degrees through the torque module, during switching between the unfolded state and the folded state.

12. The foldable electronic device as claimed in claim 1, wherein the first panel assembly further includes a first connecting rod and a first drip plate and the second panel assembly further includes a second connecting rod and a second drip plate, the first wing member has a first central pivot portion, the second wing member has a second central pivot portion, wherein the first connecting rod is pivotally connected to the first central pivot portion, the first drip plate is connected to the first carrying member and the first connecting rod respectively, the second connecting rod is pivotally connected to the second central pivot portion, and the second drip plate is connected to the second carrying member and the second connecting rod respectively, wherein, in the unfolded state, the flexible screen is flattened, and the first wing member, the second wing member, the first drip plate, the second drip plate and the central base jointly support the bendable area, and wherein, in the folded state, the bendable area of the flexible screen bends, and the first wing member, the second wing member, the first drip plate, the second drip plate and the central base collectively define an accommodating space for accommodating the bendable area.

13. The foldable electronic device as claimed in claim 12, wherein the first drip plate has a first pivot convex part and a first arc-shaped edge slider, the first carrying member has a first outer arc-shaped slideway, the first arc-shaped edge slider is slidably disposed in the first outer arc-shaped slideway, the first connecting rod has a first pivot head and a first pivot tail, the first pivot convex part is pivoted to the first pivot head, and the first pivot tail is pivoted to the first central pivot portion, and wherein the second drip plate has a second pivot convex part and a second arc-shaped edge slider, the second carrying member has a second outer arc-shaped slideway, the second arc-shaped edge slider is slidably disposed in the second outer arc-shaped slideway, the second connecting rod has a second pivot head and a second pivot tail, the second pivot convex part is pivoted to the second pivot head, and the second pivot tail is pivoted to the second central pivot portion.

14. The foldable electronic device as claimed in claim 13, wherein the first central pivot portion and the first pivot tail jointly define a first tail pivot axis, and the first connecting rod rotates relative to the first wing member about the first tail pivot axis, wherein the first outer arc-shaped slideway defines a first outer virtual axis, the first pivot head defines a first head pivot axis, and the first drip plate rotates relative to the first carrying member and the first connecting rod respectively about the first outer virtual axis and the first head pivot axis, wherein the second central pivot portion and the second pivot tail jointly define a second tail pivot axis, and the second connecting rod rotates relative to the second wing member about the second tail pivot axis, wherein the second outer arc-shaped slideway defines a second outer virtual axis, the second pivot head defines a second head pivot axis, and the second drip plate rotates relative to the second carrying member and the second connecting rod respectively about the second outer virtual axis and the second head pivot axis, and wherein the first axis, the first inner virtual axis, the first outer rotation axis, the first tail pivot axis, the first outer virtual axis, the first head pivot axis, the second axis, the second inner virtual axis, the second outer rotation axis, the second tail pivot axis, the second outer virtual axis, the second head pivot axis are parallel to one another.

15. The foldable electronic device as claimed in claim 14, wherein, in the unfolded state, the first drip plate and the second drip plate are substantially 180 degrees apart, and wherein, in the folded state, the first drip plate and the second drip plate are substantially −30 degrees apart, and the accommodating space has a water-drop-shaped cross section.

* * * * *